United States Patent [19]
Tuckey et al.

[11] Patent Number: 5,979,485
[45] Date of Patent: Nov. 9, 1999

[54] FUEL TANK LEVEL EQUALIZER SYSTEM

[75] Inventors: Charles H. Tuckey, Cass City; G. Clarke Oberheide, Troy, both of Mich.

[73] Assignee: Walbro Corporation, Cass City, Mich.

[21] Appl. No.: 08/673,068

[22] Filed: Jul. 1, 1996

[51] Int. Cl.$^6$ .............................. F02M 33/02; F04F 10/00
[52] U.S. Cl. ........................ 137/143; 137/147; 137/574; 123/510
[58] Field of Search .................................. 137/571, 574, 137/510, 142, 147, 143; 123/463, 510

[56] References Cited

U.S. PATENT DOCUMENTS

| | | | |
|---|---|---|---|
| 2,953,156 | 9/1960 | Bryant | 137/576 X |
| 3,083,720 | 4/1963 | Cartwright et al. | 137/142 X |
| 4,579,139 | 4/1986 | Stouffer | 137/142 |
| 4,838,307 | 6/1989 | Sasaki et al. | 137/574 |
| 4,951,699 | 8/1990 | Lipman | 137/147 |
| 5,078,169 | 1/1992 | Scheurenbrand et al. | 137/574 |
| 5,170,764 | 12/1992 | Tuckey | 137/571 |
| 5,265,644 | 11/1993 | Tuckey | 137/510 |
| 5,289,810 | 3/1994 | Bauer et al. | 123/510 |

*Primary Examiner*—John Rivell
*Attorney, Agent, or Firm*—Reising, Ethington, Barnes, Kisselle, Learman & McCulloch, P.C.

[57] ABSTRACT

A fuel delivery system for vehicles with more than one fuel tank or a single tank with separate sections under at least some fuel level conditions. The system has an electric fuel pump disposed in the fuel container and a jet pump connected to the electric fuel pump with fuel pickups connected to the jet pump through a siphon. The electric fuel pump powers the jet pump to fill the siphon with liquid fuel and draw fuel through the pickups which are spaced apart in separate sections of the fuel container. When the siphon is completely filled with liquid fuel and the jet pump is operating, any difference in the heads or fuel levels in the sections of the fuel container will cause fuel to flow through the siphon from the section with the greater head to the other section of the tank. This flow, due to the difference in pressure associated with different fuel levels, continues until the fuel levels and, hence, the pressures are substantially the same in each section of the container. Therefore, a single fuel level sensor can be used to monitor the total amount of fuel remaining in the tank or tanks. An air break interrupts the operation of the siphon when the jet pump is not operating to maintain the same fuel level in the sections or tanks even though the vehicle and hence the container or tanks are inclined when the vehicle and pumps are not operating.

32 Claims, 5 Drawing Sheets

FUEL TANK LEVEL EQUALIZER SYSTEM

FIELD OF THE INVENTION

This invention relates to fuel delivery systems for internal combustion engines and more particularly to fuel delivery systems for vehicles with dual fuel tanks or with fuel tanks having separate sections.

BACKGROUND OF THE INVENTION

Some vehicles such as trucks, boats and motor cycles have more than one fuel tank or a single fuel tank that has distinct sections which effectively function as more than one tank at certain fuel levels. Current fuel delivery systems have been designed to draw fuel from each tank, or each distinct section of a tank, and deliver that fuel to an engine.

While these fuel delivery systems have been effective at drawing fuel from different locations within a tank, they have drawn the fuel independently and unequally from the various locations. This unequal fuel draw leads to different fuel levels in different tanks, or separate sections of a tank, and thus, multiple fuel level sensors are needed to determine the total amount of fuel remaining in the vehicle's tank or tanks.

SUMMARY OF THE INVENTION

A fuel delivery system that maintains equal fuel levels in each section of a fuel tank or tanks so that a single fuel level sensor can monitor the total amount of fuel remaining in the vehicle. The fuel delivery system utilizes a fuel pump with a fuel inlet connected to a siphon communicating with at least two sections of a tank or two separate tanks. The siphon also communicates with a vacuum source to fill the siphon with liquid fuel. Preferably, the pump has a first stage turbine or positive displacement pump driven by an electric motor and a second stage jet pump connected to the siphon to provide a vacuum source for filling the siphon with fuel.

When the electric fuel pump is operating, the jet pump removes the air from the siphon tube and when the fuel pump is not operating, the jet pump provides air flow back into the system to interrupt the siphoning action. To prime the siphon with liquid fuel when the fuel pump is operating, the jet pump removes the air from the siphon and draws fuel preferably through a pair of fuel pickups which are disposed in separate portions of the fuel tank adjacent the bottom to draw fuel from each portion of the tank. The pickups are in communication with each other and thus, a difference in the head or pressure between the pickups, due to a difference in fuel levels adjacent the pickups, causes a corresponding flow between them. This flow continues until the fuel levels adjacent each pickup, and thus, the corresponding heads or pressures, are substantially the same. Further, the siphon tends to draw fuel into the pump in proportion to the heads and thus, tend to more rapidly equalize the fuel level in the sections. This keeps the fuel levels in the separate tanks, or separate sections of a tank, equal to each other enabling a single fuel level sensor to monitor the total fuel level for the tank or tanks.

Objects, features and advantages of this invention are to provide a fuel delivery system for fuel containers with more than one section or tank that provides excellent low fuel level performance, draws fuel from each section of the container, delivers sufficient fuel to the fuel pump module, maintains a common fuel level in each section of the container, utilizes a single fuel level sensor to monitor the total fuel level in the container, is readily adaptable to various fuel container designs, is of relatively simple design, economical manufacture and assembly and has a long, useful life in service.

BRIEF DESCRIPTION OF THE DRAWINGS

These and other objects, features and advantages of this invention will be apparent from the following detailed description of the preferred embodiment and best mode, appended claims, and accompanying drawings in which:

DETAILED DESCRIPTION OF THE PREFERRED EMBODIMENT

Figure 1:
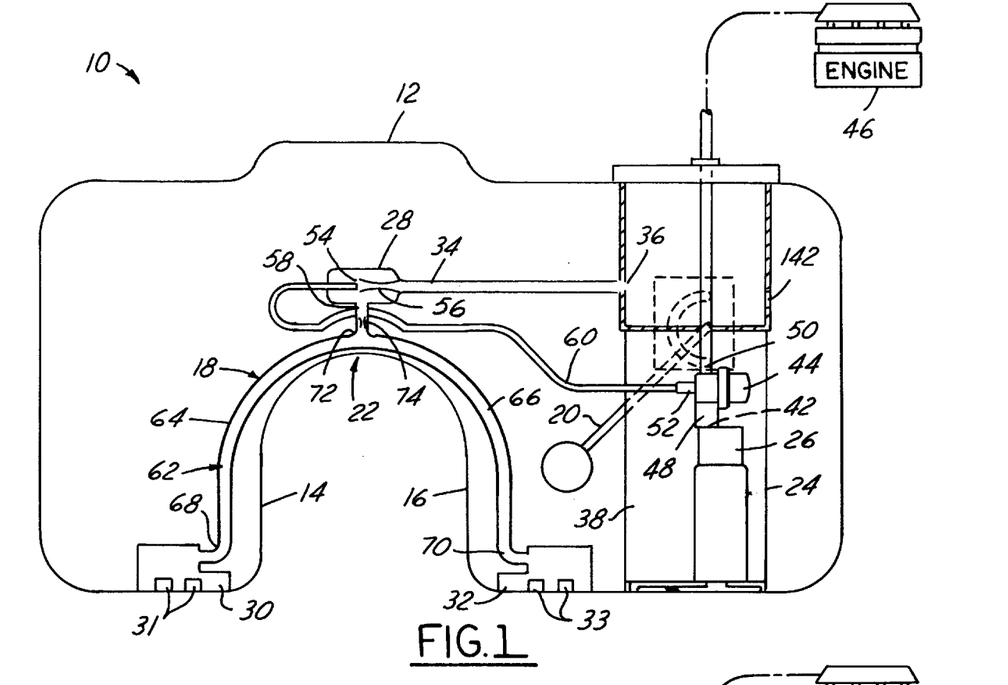
FIG. 1 is a schematic view of a saddle-shaped tank with a fuel delivery system embodying this invention.
Figure 10:
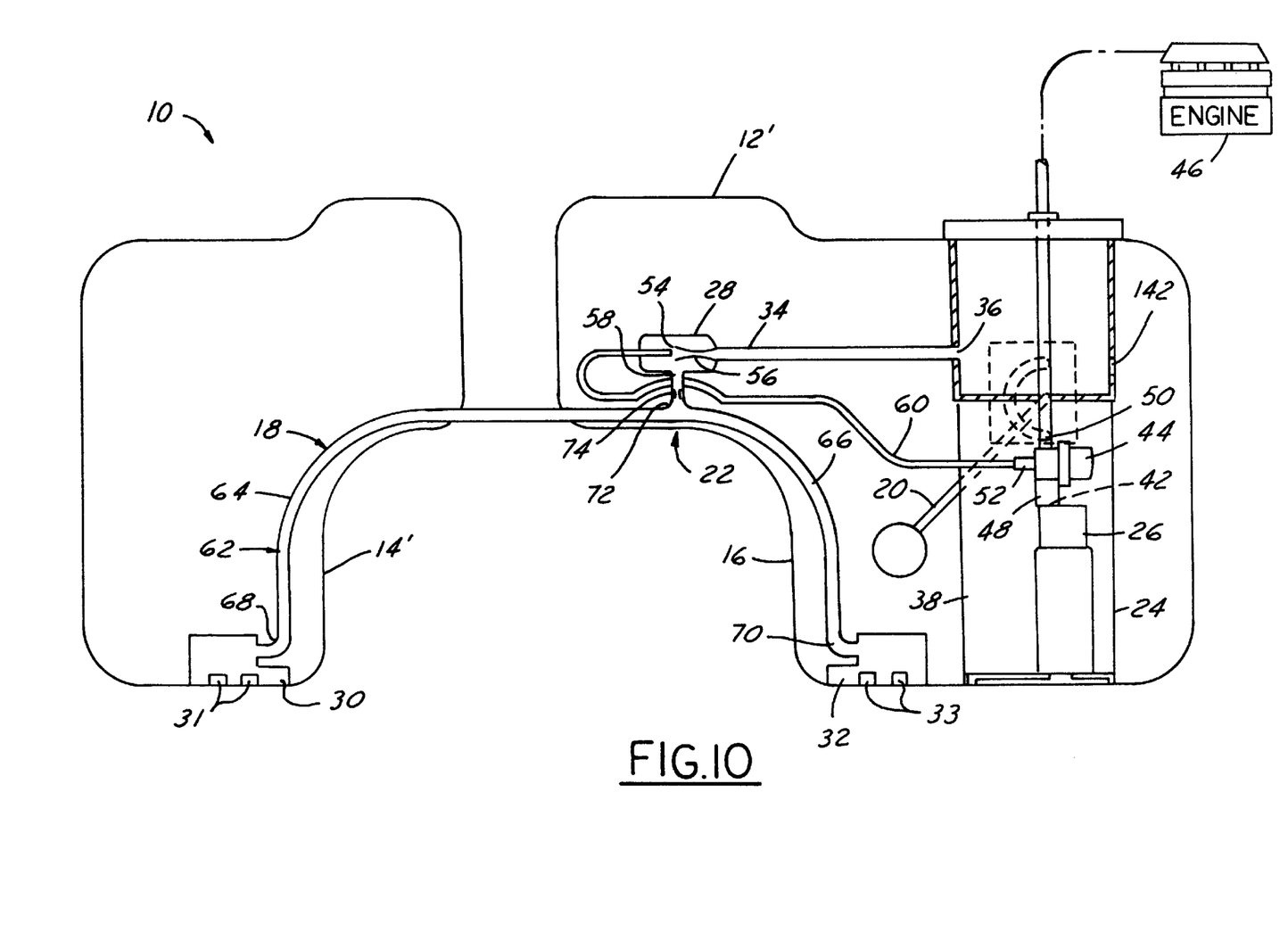
FIG. 10 is a schematic view of two separate fuel tanks of a vehicle with a fuel delivery system embodying this invention.

FIG. 1 illustrates a fuel delivery system 10 for vehicles with two separate fuel tanks (not shown), or with a single fuel tank 12 having divided sections 14, 16, with a siphon 18 that maintains an equal fuel level in the tanks, or the sections thereof, to allow a single fuel level sensor 20 to monitor the total level of fuel in the vehicle. The saddle-shaped fuel tank 12 functions as two separate tanks 14, 16 when the fuel level is below the top of the divider or "hump" 22 of the tank. A fuel pump module 24 is disposed in the fuel tank 12 with an electric fuel pump 26 within the module 24. A jet pump 28 is powered by a portion of the fuel from the outlet of the electric fuel pump 26 prime the siphon 18 by drawing fuel through a pair of fuel pickups 30, 32 which have inlets 31, 33 located adjacent the bottom of the sections 14, 16 of the tank 12. An outlet 34 of the jet pump 28 communicates with an inlet 36 of the fuel pump module reservoir 38 to ensure a constant supply of fuel to the fuel pump 26, until there is substantially no fuel left in either the fuel container 12 or fuel pump module reservoir 38. FIG. 10 illustrates the fuel delivery system 10 for a vehicle with two separate fuel tanks 14' and 16'.

The fuel pump 26 has an inlet 40 adjacent the bottom of the fuel tank 12 for drawing fuel therefrom, and an outlet 42 in communication with a bypass pressure regulator 44, as disclosed in U.S. Pat. No. 5,265,644, to deliver fuel under pressure to the engine 46. Preferably, the fuel pump 26 draws fuel directly from the fuel tank 12 until an extremely low fuel level is reached therein whereupon the inlet 40 to the fuel pump 26 closes to prevent gaseous flow through the inlet 40. The fuel pump 26 will then draw fuel from the reservoir 38 of the fuel pump module 24 until there is not enough fuel left in the module 24 to adequately supply the engine 46, whereupon the engine 46 will stop running.

The regulator 44 has a fuel inlet 48 in communication with the fuel outlet 42 of the fuel pump 26, a primary fuel outlet 50 to supply fuel to the engine 46, and a bypass outlet 52 to supply fuel to the jet pump 28. Preferably, the regulator 44 functions to deliver fuel to the engine 46 at a substantially constant pressure. Also preferably, in normal operation, the regulator 44 bypasses a portion of fuel from the outlet 42 of the fuel pump 26 through the bypass outlet 52, to power the jet pump 28.

The jet pump 28 has a nozzle 54, a venturi passage 56 located downstream of the nozzle 54, a fuel inlet 58 and the fuel outlet 34. In operation, the jet pump 28 is powered by liquid fuel supplied to the nozzle 54 through a conduit 60 connected to the bypass outlet 52 of the regulator 44. Fuel is drawn into the jet pump 28 from the fuel pickups 30, 32 through a generally U-shape siphon tube 62 having a pair of legs 64, 66 connected at their ends to the outlets 68, 70 of the pickups 30, 32. The siphon tube 62 is connected at its mid portion to the pump inlet 58 through a T connector 72 and a restricted orifice 74. The construction of the jet pump 28 and the location of the connector 72 at the highest point in the siphon tube 62 insures that when the jet pump 28 is not operating, the action of the siphon tube 62 will be interrupted by bleeding air into the tube 62 so that fuel is not transferred from one section of the tank 12 to the other even though the head or fuel levels are different in each section, such as when the vehicle is parked on an incline, slope or hill. Bleeding air into the tube 62 insures the siphoning action is interrupted when the jet pump 28 is not operating and the fuel level is below the top or uppermost portion of the siphon tube 62. The restricted orifice 74 is optional and merely insures that when initially operating the jet pump 28 develops sufficient suction or lift at its inlet 58 to remove all air from the tube 62 and draw liquid fuel through the tube 62 into the jet pump 28. The restricted orifice 74 must be large enough to prohibit the capillary action of liquid fuel from preventing the reverse flow of air through the orifice 74 and into the siphon tube 62 when the fuel level is below the top of the siphon tube 62 and the jet pump 28 is not operating. Typically, the restricted orifice 74 has a minimum diameter of about 0.030 of an inch.

Figure 2:
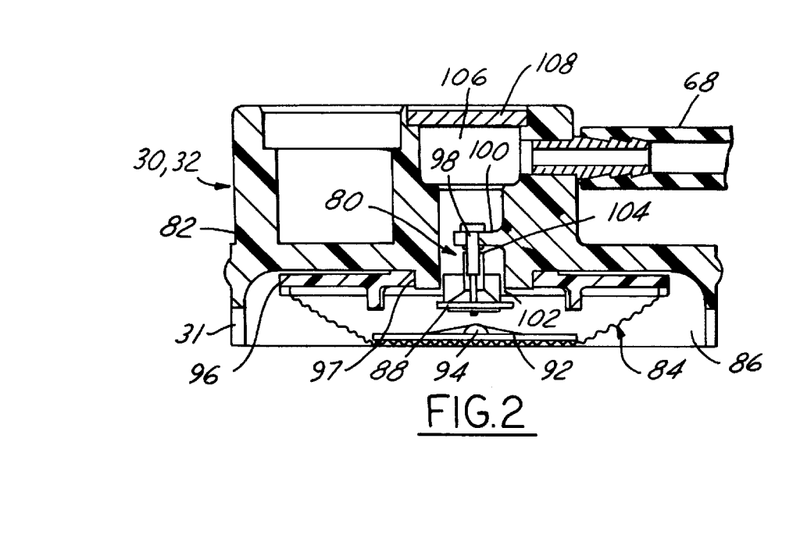
FIG. 2 is a sectional view of a presently preferred embodiment of a pickup.

To draw fuel from the separate sections 14, 16 of the tank 12, the fuel pickups 30, 32 are spaced apart and located adjacent the bottom or the lowest portion of each section 14, 16 of the fuel tank 12 or of separate fuel tanks. As shown in FIG. 2, each pickup 30, 32 has a flow valve assembly 80 received in a housing 82 and actuated by a filter and diaphragm assembly 84 received in a recess 86 at the bottom of the housing 82 so that the valve 88 is open when the filter assembly is immersed in liquid fuel and is closed by the filter assembly in the absence of liquid fuel at the pickup inlet 31, 33. Preferably, in every embodiment, each pickup 30, 32 opens and closes independently allowing fuel to continue to be drawn from one pickup when the other is closed due to a lack of fuel adjacent that pickup. This allows substantially all of the fuel in each section 14, 16 of the tank 12 to be used by the vehicle.

As shown in FIG. 2, the filter 84 has a rigid disk 92 with a central dome-shaped contact 94 attached adjacent the filter 84. The periphery of the filter 84 is attached by a heat seal to the outer edge of a mounting ring 96 press fit onto a neck 97 of the housing 82. The valve assembly 80 has a control valve 88 attached to a stem 98 that is slidably received for reciprocation in a side support projection 100 of the housing 82. The valve 88 cooperates with a valve seat 102 in the housing 82 and is biased to an open position by a spring 104. A through passage 106 is closed by a cap 108 to prevent fuel flow through the passage 106.

Preferably, the filter 84 is constructed of a flexible material having small openings which, when wet, will resist the flow of air because of the capillary action of the liquid fuel. In the absence of fuel at the inlet to a pickup 31, 33 air in the main tank will try to pass through the filter material 84. The wet filter material 84 will prohibit the passage of air due to the liquid capillary seal of the filter 84. The pressure drop above the filter 84 created by the operating fuel pump 26 will cause the filter to be displaced upwardly, like a diaphragm. This displacement will cause the domed contact 94 of the rigid disk 92 to contact the control valve 88 and move it upward, closing it on the valve seat 102 of the housing 82. When liquid fuel is again available at the inlet 31, 33 to the pickups 30, 32 the filter 84 will return to its original position and function as a filter with liquid fuel passing through it. The valve 88 will also return to its original open position due to gravity and the force of the spring 104.

Figure 3:
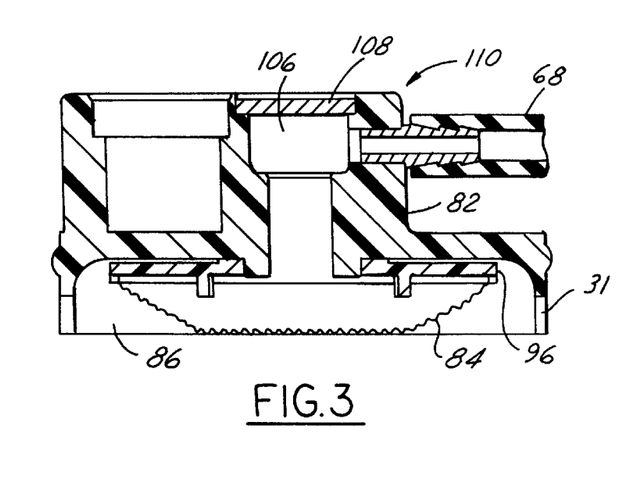
FIG. 3 is a sectional view of an alternate pickup construction.

FIG. 3 shows a modified pickup 110 with a filter 84 received in the recess 86 of the pickup housing 82 which also acts as a valve to control the flow through the pickup 110. As disclosed above, the filter 84 allows liquid fuel to flow therethrough but prohibits the flow of air through the filter when fuel is absent from the pickup inlet 31, 33. Thus, the wet filter 84 itself acts as a valve by closing the inlet 31, 33 of the pickup 110 to the inflow of air in the absence of fuel at the inlet 31, 33.

Figure 4:
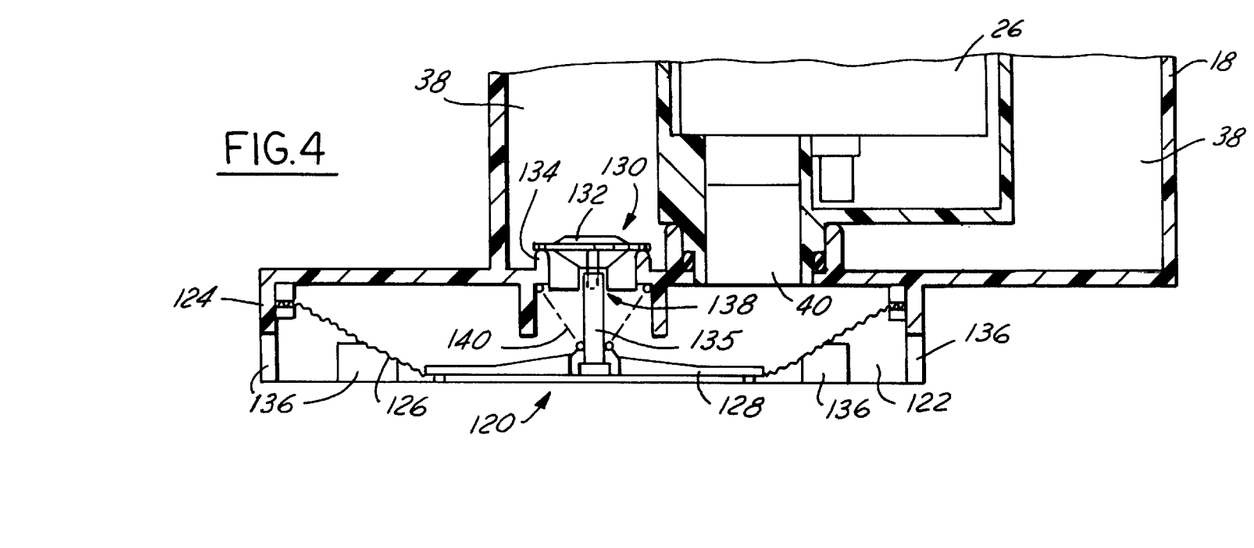
FIG. 4 is a sectional view of the filter/valve assembly adjacent the inlet to the fuel pump of FIG. 1.

In the preferred embodiment, as shown in FIG. 4, the inlet 40 to the fuel pump 26 also has a filter/diaphragm and flow valve assembly 120 received in a recess 122 of a housing 124 adjacent the bottom of the fuel reservoir 38. The filter 126 has a rigid disk 128 attached adjacent its center and the periphery of the filter 126 is heat sealed to the housing 124. A valve assembly 130 has a valve head 132 engagable with a valve seat 134 and connected to one end of a stem 135 slidably received for reciprocation in a housing opening 138 and operably connected to the disk 128 of the filter 126. The valve 130 is yieldably biased to its closed position by a spring 140 received between the housing 124 and the disk 128.

As in the previously described embodiments, the material of the filter 126 allows liquid fuel flow therethrough but prohibits the flow of air due to the capillary seal of the "wetted" filter material. Thus, when fuel is absent from the inlets 136 to the housing 124, the filter 126 prevents air from entering the pump 26 and the pressure drop above the filter 126, created by the operating pump 26, displaces the filter 126 upward, like a diaphragm. This displacement causes a corresponding displacement of the valve 130, moving the valve 130 away from the seat 134 and into an open position. With the valve 130 open, fuel in the fuel pump reservoir 38 flows to the inlet 40 of the pump 26 supplying the pump 26 with fuel when there is no fuel in the fuel tank 12 adjacent the inlets 136 of the housing 124. Preferably, the valve 130 opens and closes independently from the other fuel inlets or pickups 30, 32 or 110 to ensure that when fuel is absent from the inlets 136 the reserve fuel in the reservoir 38 is supplied to the pump inlet 40.

In use, when the electric fuel pump 26 is operating, the regulator 44 bypasses a portion of outlet fuel through the bypass outlet 52. This fuel flows through the conduit 60 to the nozzle 54 of the jet pump 28 to power the jet pump 28. The fuel then flows from the nozzle 54 to the venturi passage 56 located downstream from, and in communication with, the outlet of the nozzle 54. From the venturi passage 56 the fuel flows to the outlet of the jet pump 34 which delivers fuel to the fuel pump reservoir 38.

While the above described fuel flow is occurring, a second fuel flow is induced from the pressure drop which occurs due to the fuel flow through the venturi passage 56. This pressure drop draws any air or vapor, out of the siphon tube 62 and through the jet pump 28, expelling it into the fuel pump reservoir 38 where the air separates from the liquid fuel. In addition to removing the air from the siphon 18, the jet pump 28 draws liquid fuel through the pickups 30, 32 so that the fuel completely fills the siphon tube 62 to prime it. From there, fuel is drawn through the jet pump 28 and is delivered to the fuel pump reservoir 38. Preferably, the jet pump 28 is located above the pickups 30, 32 in the tank 12 so that flow occurs from the pickups 30, 32 to the jet pump 28 only when the electric fuel pump 26 is operating and a sufficient pressure drop is created by the jet pump 28.

In use, when the electric fuel pump 26 is not operating, there is no fuel supplied to power the jet pump 28, and thus, the jet pump 28 does not draw any air or fuel from the siphon 18. When the level of fuel in the container 12 is below the outlet 34 of the jet pump 28 air will reverse flow from the fuel pump module reservoir 38 through the outlet 34 of the jet pump 28. Further, if the level of fuel in the container 12 is below the top or uppermost portion of the siphon tube 62, the air will enter the siphon tube 62 providing an air break to interrupt the siphon. When the siphon action is interrupted fuel will not be transferred from one section 14, 16 of the fuel container 12 to another even though the heads or fuel levels in the sections 14, 16 are different, such as when the vehicle is parked on an inclined surface.

As described above, both the fuel drawn through the pickups 30, 32 and the fuel from the bypass outlet 52 of the regulator 44 are used to fill the fuel pump reservoir 38. Preferably, to prevent the fuel pump reservoir 38 from being filled with liquid fuel above the height of the inlet 36 when the level of fuel in the main container 12 is below that height, an opening or vent 142 is located in the sidewall of the reservoir 38 below the inlet 36. The vent 142 enables fuel to flow from the reservoir 38 into the main tank 12 when the level of fuel in the module 18 reaches the vent 142. This allows air to remain in the upper portion of the reservoir 38 to the extent it is not displaced by the fuel in the main tank 12. Thus, when the jet pump 28 is not operating and the level of fuel in the container 12 is below the fuel pump module inlet 36, air is available at the jet pump outlet 34 to provide the air break for the siphon as described above.

When there is fuel at the inlet 31, 33 to the pickups 30, 32, their corresponding filter and valve assemblies are in an open position and fuel can flow substantially freely through them. This substantially free flow of fuel helps to maintain equal fuel levels in both sections 14, 16 of the tank 12 when the jet pump 28 is operating and the siphoning action has been created. Due to the siphon, if one section 14 of the tank 12 were to have a greater head, or higher level of fuel than the other section 16, fuel would tend to flow from that section 14 of the tank 12 to an area of lower pressure, namely, the other section 16 of the tank 12. This flow occurs because the section 14 with the higher fuel level has a corresponding higher pressure acting downward, due to gravity. This higher pressure causes fuel to flow from that section 14 to a section 16 of lower pressure until the pressure differential on the fuel, which causes it to flow from one section to the other, is zero. This equilibrium is reached when the fuel levels are substantially the same in both sections 14, 16 of the tank 12 such that the pressures, due to gravity on the fuel, are substantially the same in both sections 14, 16 of the tank 12. Further, when the level of fuel is nearly the same in each tank or section thereof, the suction created by the jet pump 28 will tend to draw fuel equally from each section 14, 16 of the tank keeping the fuel levels in the different sections of the tank substantially equal. When the fuel levels are equal the single fuel level sensor 20 correctly indicates the total quantity of fuel remaining in the entire tank 12 or tanks of a fuel system.

Figure 5:
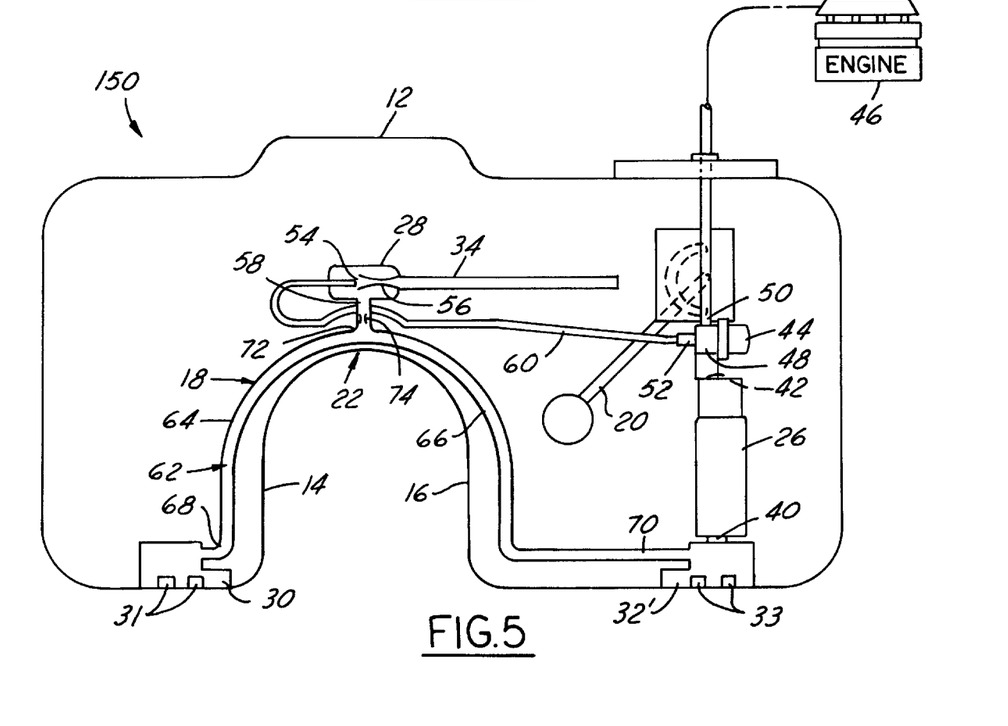
FIG. 5 is a schematic view of an alternate fuel delivery system embodying this invention.

FIG. 5 shows another embodiment 150 of the invention, also disposed in a saddle-shaped tank 12 with a central hump 22 dividing the tank when the fuel level is below the top of the hump 22. In this embodiment, the fuel pump 26 is disposed directly in the fuel container 12. The jet pump 28 functions in substantially the same manner as described above by removing the air from the siphon tube 62 and filling the siphon tube 62 with liquid fuel when the jet pump 28 is operating. However, the outlet 34 of the jet pump 28 delivers fuel directly to the section 16 of the tank 12 that contains the fuel pump 26, not to a reservoir of a fuel pump module.

Figure 6:
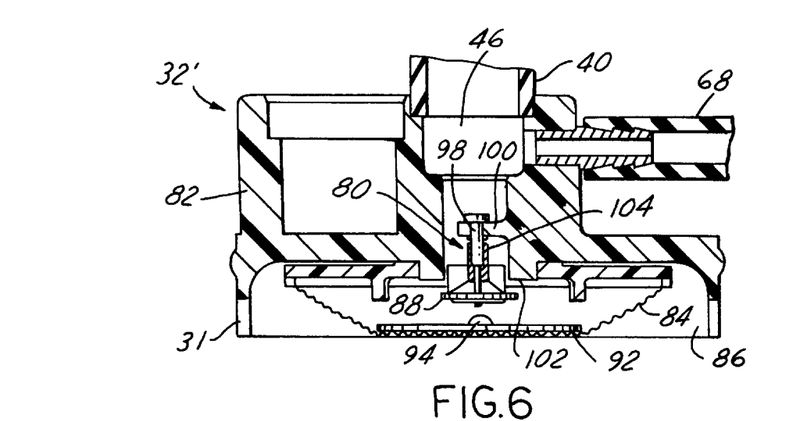
FIG. 6 is a sectional view of a pickup adjacent the fuel pump of FIG. 5.

The fuel pump 26, in this embodiment, is disposed on and communicates directly with a fuel pickup 32'. As shown in FIG. 6 the pickup 32' is substantially the same as the pickup 32 except that the passage 106 is not closed by a plug. Instead, the inlet 40 to the fuel pump 26 is telescoped into and communicates with the passage 106 of the pickup 32' to allow fuel to be drawn through the pickup 32' into the fuel pump 26.

In this embodiment, the siphon tube 62 communicates with the pickup 30 to the left of the divider 22 in FIG. 5 and the pickup 32' to the right of the divider 22 in FIG. 5, which is beneath the fuel pump 26. Fuel also flows through both when the jet pump is operating and a sufficient siphon action is created. The siphon 18 functions in substantially the same manner as described earlier so that a difference in the heads or fuel levels in the sections 14, 16 of the tank 12 will cause a fuel flow until each section 14, 16 of the tank 12 has substantially the same level of fuel.

Therefore, with both pickups 30, 32' in communication with each other, and with the siphon action created by the jet pump 28 filling the tube 62 with liquid fuel, the fuel levels in each section 14, 16 of a fuel tank 12, or the fuel levels in separate fuel tanks, will tend to remain equal to each other. Thus, with this system 150, the various portions of the fuel container 12 have substantially the same fuel level allowing use of a single fuel level sensor to monitor the total level of fuel in the system. In this system 150 the pickups 30, 32' close independently in the absence of fuel adjacent the pickups 30 and/or 32' to prevent gaseous flow through them.

Figure 7:
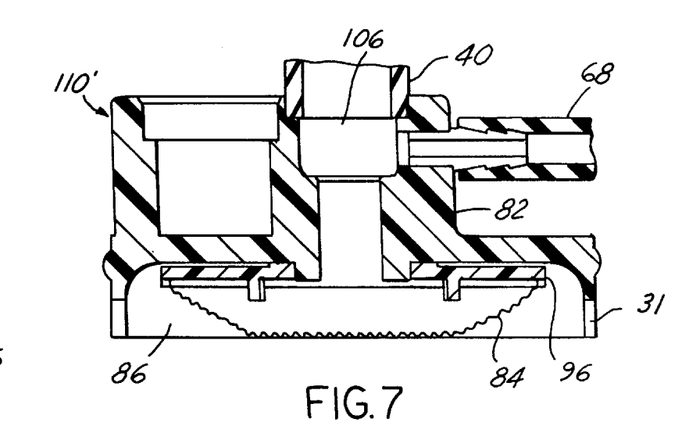
FIG. 7 is a sectional view of an alternate embodiment of the pickup adjacent the fuel pump of FIG. 5.

FIG. 7 illustrates a modification in which the fuel pickup 110' is substituted for the pickup 32' in the system 150. The pickup 110' eliminates the valve assembly 80. In all of the fuel pickups, to insure the capillary action of the wet filter material 84, 126 will adequately inhibit air flow, the average pore size of the openings in the filter material is not greater than about 100 microns.

Figure 8:
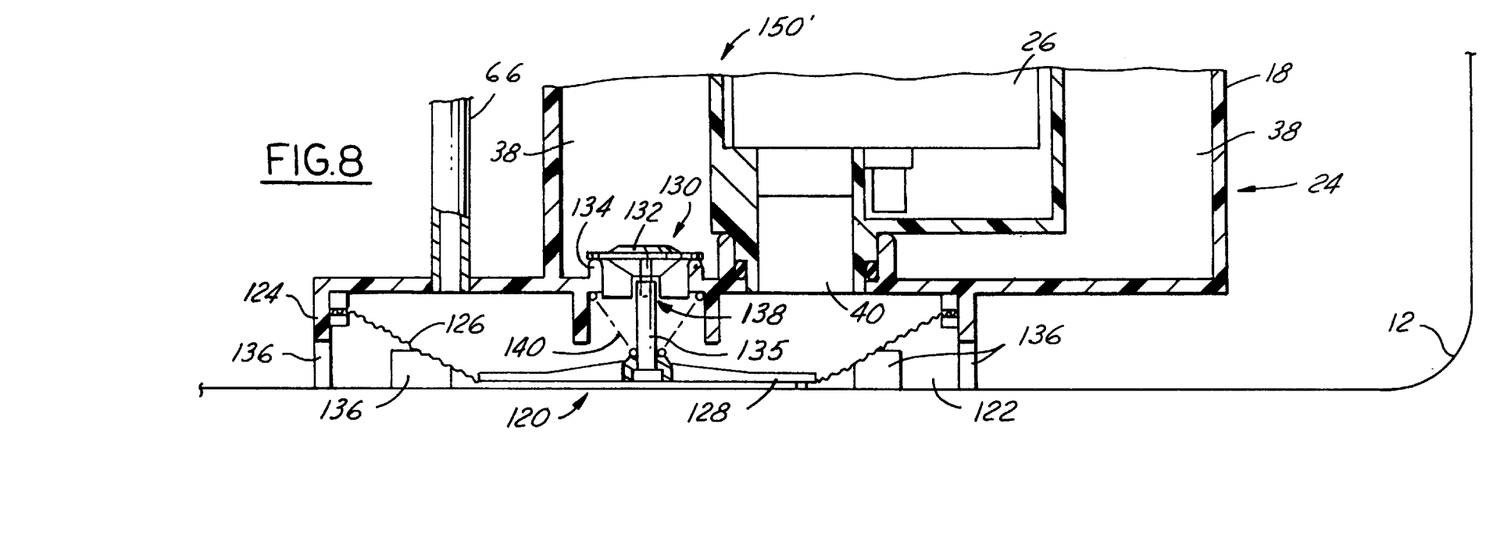
FIG. 8 is a fragmentary semi-schematic view of a modification of the fuel delivery system of FIG. 5.

FIG. 8 illustrates a modification 150' of the system 150 in which the fuel pump module 24 is utilized and the flow valve assembly 120 is substituted for the pickup 32'. The siphon tube 66 opens into a portion of the housing 124 enclosed by the filter 126. This modified system functions and operates in substantially the same manner as the system 150 and thus the description of its functions and operation will not be repeated.

Figure 9:
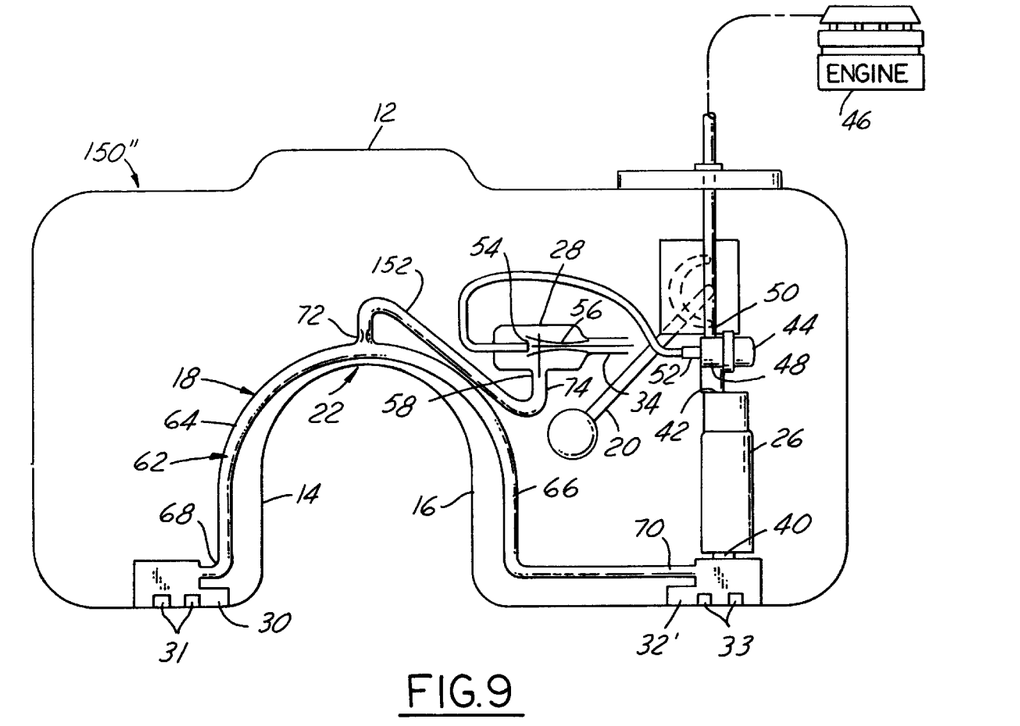
FIG. 9 is a schematic view of an alternate fuel delivery system embodying this invention.

FIG. 9 illustrates another modification 150" of the system 150 in which the jet pump 28 is positioned in the right side 16 of the fuel tank rather than on top of the siphon tube 62 and is connected to it by a conduit 152. This system 150" also functions and operates in substantially the same manner as the system 150 and hence, the description of its functions and operation will not be repeated.

It will be apparent to skilled persons that a variety of vacuum or suction sources other than the jet pump can be used to prime the siphon. Some of these vacuum sources or devices are a tap off the inlet to the primary fuel pump 26, manifold vacuum of the engine 46, a separate positive displacement or turbine pump which may be driven by the electric motor of the fuel pump 26 or by a separate prime mover and other vacuum producing devices known to skilled persons.

We claim:

1. A fuel delivery system for an internal combustion engine comprising; a fuel pump driven by an electric motor and constructed to be disposed in a liquid fuel container with at least two sections which are separated from each other under at least some fuel level conditions, said fuel pump having a pump inlet disposed adjacent the bottom of the fuel container and a pump outlet for delivering fuel under pressure to the engine, at least two fuel pickups spaced apart and disposed adjacent the bottom of said fuel container each in a separate section and each having an inlet at a lower portion of its associated separate section of the fuel container, an outlet and a valve member which permits liquid fuel to flow through the inlet when the inlet is immersed in liquid fuel and prevents gaseous flow through the inlet in the absence of liquid fuel at the inlet, a siphon communicating and connected with the outlets of all of the pickups, a vacuum producing device having an inlet communicating with the siphon so that when operating the vacuum device removes any gas from the siphon to fill the siphon with liquid fuel and initiate action of the siphon to tend to equalize the level of fuel in all the sections of the fuel container, and an air break disposed above and communicating with the uppermost portion of the siphon to provide air to the siphon when the vacuum device is not operating and the fuel level in the fuel container is below said uppermost portion of the siphon to interrupt the siphon action.

2. The fuel delivery system of claim 1 wherein each of two of the sections of said fuel container comprises a separate fuel tank and at least one pickup is disposed in each separate fuel tank.

3. The fuel delivery system of claim 1 wherein said fuel container is a single fuel tank having the two sections separated from each other at least at certain fuel levels, and at least one pickup is disposed in each separate section of said fuel tank.

4. The fuel delivery system of claim 1 wherein said vacuum producing device comprises a jet pump having a nozzle and a venturi passage constructed to receive fuel discharged from the outlet of said nozzle.

5. The fuel delivery system of claim 1 which comprises an orifice between said inlet of said vacuum producing device and said siphon with an opening large enough to interrupt the siphon when the vacuum producing device is not operating.

6. The fuel delivery system of claim 5 wherein said orifice opening has a size in the range of about 0.020" to 0.040".

7. The fuel delivery system of claim 1 wherein said vacuum producing device comprises a jet pump located generally vertically above said fuel pickups and said jet pump provides sufficient aspiration to prime the siphon to remove any air or fuel vapor from the siphon and deliver liquid fuel to the operating jet pump.

8. The fuel delivery system of claim 1 which also comprises only one fuel level sensor in the fuel container.

9. The fuel delivery system of claim 1 in which said air break has an air inlet which does not admit air to the siphon when the vacuum producing device is operating normally.

10. The fuel delivery system of claim 9 wherein the air inlet is located adjacent the generally vertically highest portion of the siphon.

11. The fuel delivery system of claim 1 wherein the valve member comprises a filter which when immersed in liquid fuel permits liquid fuel to flow therethrough and prevents gaseous flow therethrough when not immersed in liquid fuel.

12. The fuel delivery system of claim 1 wherein the valve member comprises a diaphragm, a valve and a valve seat, the valve is open when the inlet is immersed in liquid fuel to permit liquid fuel to flow through the inlet and the diaphragm closes the valve on the valve seat in the absence of liquid fuel adjacent the inlet to prevent gaseous flow through the inlet.

13. The fuel delivery system of claim 1 which comprises only one fuel level sensor disposed in only one section of the liquid fuel container and responsive to the fuel level in only said one section of the fuel container to thereby monitor the level of all the fuel in the fuel container.

14. The fuel delivery system of claim 1 wherein the vacuum device comprises a jet pump disposed completely within the fuel container and having an inlet communicating with the siphon, a second inlet communicating within the fuel container with the fuel pump outlet and an outlet for discharging fuel received in the second inlet to the fuel container and the flow of fuel from the second inlet to the outlet of the jet pump creates a drop in pressure at the jet pump inlet to remove any gas from the siphon.

15. A fuel delivery system for an internal combustion engine comprising; a fuel pump module constructed to be disposed in a fuel container with at least two sections which are separated from each other under at least some fuel level conditions, a first fuel pump disposed in said module having a fuel inlet disposed adjacent the bottom of the fuel container and a fuel outlet for delivering fuel under pressure to the engine, a jet pump communicating completely within the fuel container with the fuel outlet of the first fuel pump and powered by a portion of outlet fuel from said first pump and having an inlet, at least two fuel pickups spaced apart and each disposed in a separate section of the fuel container adjacent the bottom of its associated separate section of the fuel container and each having an inlet at a lower portion of its associated separate section of the fuel container, an outlet and a valve member which permits liquid fuel to flow through the inlet when the inlet is immersed in liquid fuel and prevents gaseous flow through the inlet in the absence of liquid fuel at the inlet, a siphon communicating and connected with the outlets of all of the pickups and the inlet of the jet pump so that when the jet pump is operating the jet pump removes any gas from the siphon to fill the siphon with liquid fuel and initiate action of the siphon to equalize the level of fuel in all of the sections of the fuel container, and an air break disposed above and communicating with the uppermost portion of the siphon to interrupt the siphon action.

16. The fuel delivery system of claim 15 wherein each section of said fuel container is a separate fuel tank and each said pickup is disposed in a separate fuel tank.

17. The fuel delivery system of claim 15 wherein said fuel container is a single fuel tank having the at least two sections separated from each other at least at certain fuel levels, and at least one pickup is disposed in each separate section of said fuel tank.

18. The fuel delivery system of claim 15 in which the air break has an air inlet which does not admit air to the siphon when the jet pump is operating normally.

19. The fuel delivery system of claim 18 wherein the air inlet is located adjacent the generally vertically highest portion of the siphon.

20. The fuel delivery system of claim 15 wherein the valve member comprises a filter which when immersed in liquid fuel permits liquid fuel to flow therethrough and prevents gaseous flow therethrough when not immersed in liquid fuel.

21. The fuel delivery system of claim 15 wherein the valve member comprises a diaphragm, a valve and a valve seat, the valve is open when the inlet is immersed in liquid fuel to permit liquid fuel to flow through the inlet and the diaphragm closes the valve on the valve seat in the absence of liquid fuel adjacent the inlet to prevent gaseous flow through the inlet.

22. The fuel delivery system of claim 15 which comprises only one fuel level sensor disposed in only one section of the liquid fuel container and responsive to the fuel level in only said one section of the fuel container to thereby monitor the level of all the fuel in the fuel container.

23. A fuel delivery system for an internal combustion engine comprising; a first fuel pump with an electric motor disposed in a fuel container with at least two sections which are separated from each other under at least certain fuel level conditions, said first fuel pump having a fuel inlet disposed adjacent the bottom of the fuel container and a pump outlet for delivering fuel under pressure to the engine, at least two fuel pickups spaced apart and each disposed in a separate section of the fuel container adjacent the bottom of a separate one of the sections of the fuel container, each pickup having an inlet at a lower portion of its associated separate section of the fuel container, an outlet and a valve member which permits liquid fuel to flow through the inlet when the inlet is immersed in liquid fuel and prevents gaseous flow through the inlet in the absence of liquid fuel at the inlet, a siphon connected with the outlets of all of the fuel pickups and having an outlet, a second pump having an inlet communicating with the outlet of the siphon and having a restricted orifice to increase the pressure drop across the inlet of the second pump in response to fluid flow through the orifice for drawing any air and fuel vapor and liquid fuel from the siphon when the second pump is operating, and an air break communicating with the siphon and having an inlet disposed above the siphon which is open for supplying air and fuel vapor from within the container to the siphon when the level of fuel is below the vertically highest portion of the siphon and the second pump is not operating to interrupt the siphon action and closes when the second pump is operating to prevent air and fuel vapor from being supplied to the siphon so that under normal operating conditions the second pump will completely fill the entire siphon and all of the fuel pickups with liquid fuel and while the second pump is operating the siphon will equalize the level of liquid fuel in the sections of the container.

24. The fuel delivery system of claim 23 wherein the air inlet of the air break is disposed generally vertically above the generally vertical extent of the separated sections of the container.

25. The fuel delivery system of claim 24 which also comprises a bypass pressure regulator disposed in the fuel container having a fuel inlet communicating with the fuel outlet of the first fuel pump, a primary fuel outlet constructed to communicate with the engine for supplying liquid fuel to the engine, and a bypass outlet within the fuel container which in normal operation of the first pump bypasses a part of the fuel from the outlet of the first pump, and wherein the second pump is a jet pump disposed completely within the fuel container and having a venturi passage, a fuel inlet associated with the venturi passage which is connected with the outlet of the siphon, and a nozzle connected with the bypass outlet of the pressure regulator for discharging fuel into the venturi passage when the first pump is operating and the regulator bypasses a portion of the fuel from the first pump through the bypass outlet of the regulator.

26. The fuel delivery system of claim 23 wherein the air inlet of the air break is located generally vertically at least substantially as high as the highest portion of the siphon.

27. The fuel delivery system of claim 26 wherein the air inlet of the air break is disposed generally vertically above the generally vertical extent of the separated sections of the container.

28. The fuel delivery system of claim 23 wherein the valve member comprises a filter which when immersed in liquid fuel permits liquid fuel to flow therethrough and prevents gaseous flow therethrough when not immersed in liquid fuel.

29. The fuel delivery system of claim 23 wherein the valve member comprises a diaphragm, a valve and a valve seat, the valve is open when the inlet is immersed in liquid fuel to permit liquid fuel to flow through the inlet and the diaphragm closes the valve on the valve seat in the absence of liquid fuel adjacent the inlet to prevent gaseous flow through the inlet.

30. The fuel delivery system of claim 23 which comprises only one fuel level sensor disposed in only one section of the liquid fuel container and responsive to the fuel level in only said one section of the fuel container to thereby monitor the level of all the fuel in the fuel container.

31. A fuel delivery system for a combustion engine comprising a fuel pump, a liquid fuel container with at least two sections which are separated from each other under at least some liquid fuel level conditions, a fuel inlet disposed adjacent the bottom of the fuel container and connected to the fuel pump, a pump outlet for delivering liquid fuel under pressure to the engine, a vacuum producing device having an inlet, at least two fuel pickups spaced apart and each disposed in a separate section of the fuel container and adjacent the bottom of its associated separate section of the liquid fuel container and each having an inlet for liquid fuel at a lower portion of its associated separate one section of the liquid fuel container, and a siphon communicating with all the fuel pickups and the inlet of the vacuum producing device so that when operating the vacuum device removes any gas from the siphon to fill the siphon with liquid fuel and initiate action of the siphon to substantially equalize the level of fuel in all the sections of the fuel container and an air break disposed above the uppermost portion of the siphon and communicating with the vacuum device so that when the vacuum device is not operating, air enters the inlet of the vacuum device to interrupt the siphon action to prevent any transfer of fuel through the siphon between the separate sections of the fuel container.

32. The fuel delivery system of claim 31 which comprises only one fuel level sensor disposed in only one section of the liquid fuel container and responsive to the fuel level in only said one section of the fuel container to thereby monitor the level of all the fuel in the fuel container.

* * * * *